United States Patent [19]

Mino et al.

[11] Patent Number: 5,436,033
[45] Date of Patent: Jul. 25, 1995

[54] METHOD OF MANUFACTURING A POLYMER ULTRA THIN FILM ELECTRET

[75] Inventors: Norihisa Mino; Yoshikazu Yamagata; Kazufumi Ogawa, all of Osaka, Japan

[73] Assignee: Matsushita Electric Industrial Co., Ltd., Osaka, Japan

[21] Appl. No.: 284,735

[22] Filed: Aug. 1, 1994

Related U.S. Application Data

[63] Continuation of Ser. No. 912,764, Jul. 13, 1992, abandoned.

[30] Foreign Application Priority Data

Jul. 15, 1991 [JP] Japan .................................. 3-173615

[51] Int. Cl.⁶ .............................................. B05D 3/06
[52] U.S. Cl. ................................. 427/498; 307/400; 361/225; 427/402; 427/435; 427/443.2; 427/488; 427/489; 427/496; 427/503; 427/508; 427/512; 427/513; 427/551; 427/580
[58] Field of Search ............... 427/402, 435, 443.2, 427/488, 489, 496, 498, 503, 508, 512, 513, 551, 580; 307/400; 361/225

[56] References Cited

U.S. PATENT DOCUMENTS

| | | | |
|---|---|---|---|
| 4,539,061 | 9/1985 | Sagiv | 427/496 X |
| 4,608,109 | 8/1986 | Pook | 307/400 X |
| 4,808,849 | 8/1989 | Inculet et al. | 307/400 |
| 5,008,127 | 4/1991 | Ogawa | 427/498 |
| 5,035,782 | 7/1991 | Tamura et al. | 427/498 X |
| 5,057,710 | 10/1991 | Nishiura et al. | 307/400 |
| 5,114,737 | 5/1992 | Ogawa et al. | 427/503 |
| 5,162,819 | 11/1992 | Sakai et al. | 346/153.1 |

FOREIGN PATENT DOCUMENTS

| | | |
|---|---|---|
| 0452955A2 | 10/1991 | European Pat. Off. |
| 2304629 | 10/1976 | France. |
| 3039561A1 | 7/1981 | Germany. |

OTHER PUBLICATIONS

Database WPI Week 8744, Derwent Publications Ltd., London, GB; AN 87-311235 and JP-A-62 221 103 (Matsushita Electric Ind. KK) Sep. 29, 1987 (Abstract).
Database WPI Week 8908, Derwent Publications Ltd., London, GB; AN 89-057910 and JP-A-1 010 611 (Marcon Electronics Co.) Jan. 13, 1989 (title).
Database WPI Week 8943, Derwent Publications Ltd., London, GB; AN 89-313601 and JP-A-1 232 038 (Kuraray KK) Sep. 18, 1989 (Abstract).

*Primary Examiner*—Bernard Pianalto
*Attorney, Agent, or Firm*—Fish & Richardson

[57] ABSTRACT

The invention concerns an ultra thin polymer film electret comprising a polymer and a substrate having a surface electric charge, wherein a side chain of the polymer and the substrate are physically or chemically bonded. A method of manufacturing an ultra thin polymer film electret comprising: adsorbing a monomolecular film comprising a unsaturated group or a laminated film comprising the monomolecular film on to a substrate surface, irradiating the monomolecular film or the laminated film with an energy beam to polymerize the unsaturated groups and applying a high voltage to the film is also disclosed. Further, a method of manufacturing an ultra thin polymer film electret comprising: physically bonding a side chain of the polymer to a substrate surface to form a thin film and applying a high voltage to the thin film is also disclosed.

3 Claims, 5 Drawing Sheets

METHOD OF MANUFACTURING A POLYMER ULTRA THIN FILM ELECTRET

This application is a continuation of U.S. application Ser. No. 07/912,764, filed Jul. 13, 1992, now abandoned.

FIELD OF THE PRESENT INVENTION

This invention relates to an ultra thin polymer film electret and a method of manufacturing the same.

BACKGROUND OF THE INVENTION

In the past, in manufacturing an ultra thin polymer film electret, a thin polymer film was formed by a melt extrusion method, a coating method, a physical deposition method and by applying an electric field directly to the thin polymer film together with light, heat or mechanical strength.

In the prior art, a thin polymer film having a thickness of about a dozen μm was formed. However, the orientation at the molecular level was not high. For that character of the thin polymer film it was difficult to obtain an electret which had a sufficient surface electric charge even though high voltage was applied.

In the prior method of forming a thin polymer film, it was also difficult to control the thickness of film at the molecular level. Thus, if the thickness of film was only at the molecular level, it could not be applied uniformly thin. The result was that the film had pin-holes and an island-state structure.

Further, in order to control orientation of a polymer, a film was drawn. However, in that case, there was a limitation as to how thin a film could be drawn, and the orientation of molecules could not be controlled sufficiently. Thus, in the prior art, only an electret which had a film layer more than about several hundred to several thousand angstroms in thickness could be obtained. In addition, the orientation of molecules was not high. Thus, if the thickness of the film was decreased, the surface electric charge became small.

For the above reasons, the object of the invention is to provide an ultra thin polymer film electret which is much thinner than prior polymer electrets and also has sufficient surface electric charge and a method of making the same.

SUMMARY OF THE INVENTION

According to a first aspect of the invention we provide an ultra thin polymer film electret comprising a polymer and a substrate having a surface electric charge, wherein a side chain of the polymer and the substrate are physically or chemically bonded.

It is preferable in this invention that the polymer is formed as a chemically adsorbed film.

It is preferable in this invention that the polymer is formed as a Langmuir-Blodgett's film.

It is preferable in this invention that the side chain of the polymer has a high orientation at the molecular level.

It is preferable in this invention that the polymer film is selected from the group consisting of a monomolecular film, a laminated film, and a pre-polymerized monomolecular film which is formed on the substrate surface.

According to a second aspect of the invention we provide a method of manufacturing an ultra thin polymer film electret comprising:

(1) adsorbing a monomolecular film comprising an unsaturated group or a laminated film comprising the monomolecular film on to a substrate surface,
(2) irradiating the monomolecular film or the laminated film with an energy beam to polymerize the unsaturated groups, and
(3) applying high voltage to the film.

It is preferable in this invention that the high voltage is applied on the order of $10^4$ to $10^7$ V/cm.

According to a third aspect of the invention we provide a method of manufacturing an ultra thin polymer film electret comprising:

(1) physically bonding a side chain of a polymer to a substrate surface to form a thin film, and
(2) applying high voltage to the thin film.

It is preferable in this invention that the high voltage is applied on the order of $10^4$ to $10^7$ V/cm.

In the invention, a side chain of the polymer has a high orientation at the molecular level. For the above reason, the dipole of the whole film can be made uniform and thus can provide an electret which has a high surface electric charge.

In the invention, the ultra thin polymer film electret can be formed by adsorbing a monomolecular film, a laminated film, or a pre-polymerized monomolecular film on to a substrate surface.

According to the invention, an ultra thin polymer film having orientation was formed by a chemical adsorption method or LB method. The ultra thin polymer film electret was formed by converting the film to an electret. Thus, according to the invention, there is a practical merit to form an ultra thin polymer film electret having an ultra thin film thickness and also a sufficient surface electric charge.

DETAILED DESCRIPTION OF THE INVENTION

Figure 1:
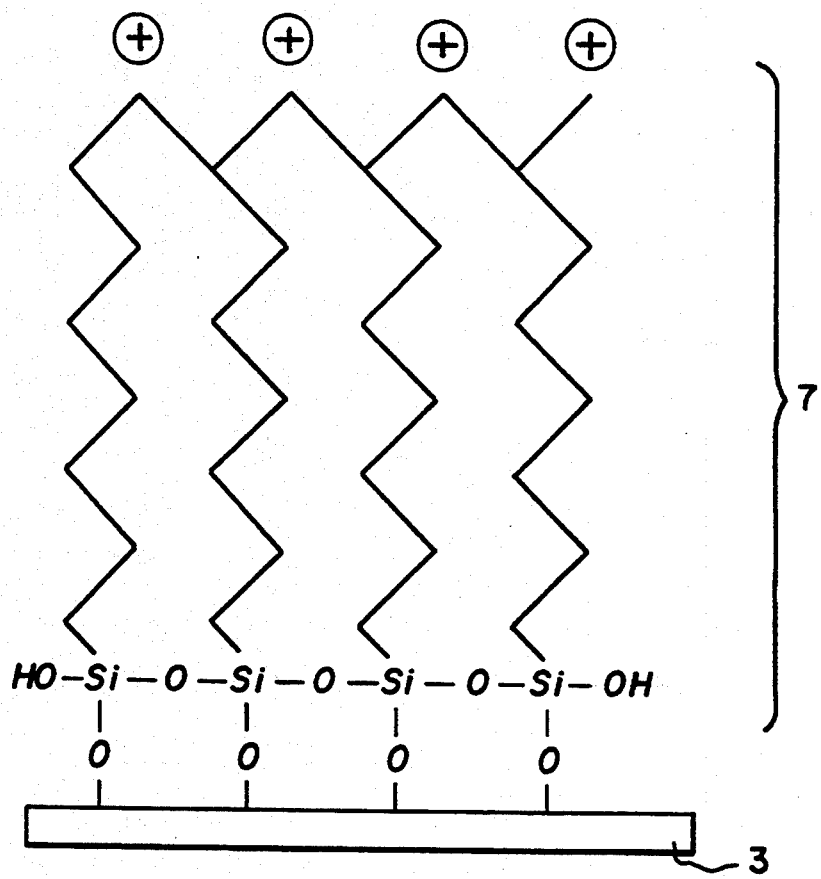
FIG. 1 shows an ultra thin polymer film electret in an example of the invention.

The invention relates to an ultra thin polymer film electret and a method of manufacturing the same and aims to provide an electret, having the thickness of a molecular film, which has a sufficient surface electric charge. According to the invention, a monomolecular film comprising an adsorptive reagent was formed on a substrate using trichlorosilane as an adsorptive reagent. After, for example, irradiating a monomolecular film with an electron beam of about 10 Mrads, for example, applying a 200 KeV/cm electric field at 120° C., an ultra thin polymer film electret was formed. An electret which has a high surface electric charge can be obtained by converting an ultra thin polymer film having high orientation into an electret.

In the invention, a chemical adsorption method or Langmuir-Blodgett's technique method is used as a step of forming the monomolecular film or a laminated film on a substrate surface. The LB method (Langmuir-Blodgett's technique) is used as a step of forming a pre-polymerized monomolecular film on a substrate surface.

An adsorbing molecule which can be used for the chemical adsorption method comprises at least a functional group which reacts to an active hydrogen and a polymerized unsaturated group. A group having an active chloro group such as a chlorosilyl group, a chloro titanium group, a chloro stannyl group (where n represents 1 or 2 or 3 and X represents a substituted group such as a hydrogen atom or a lower alkyl group or a lower alkoxyl group) is used as a functional group. A vinylene group or an ethylene group is used as a polymerized unsaturated group.

Any substrate which has an active hydrogen such as —OH group, —COOH group, >NH group, —NH$_2$ group on its surface can be used for the chemical adsorption method. For example, glass such as quartz glass, fluoride glass, metallic glass and metalic materials such as aluminum, iron, stainless steel and titanium and semiconductor materials such as silicon and germanium are used as a substrate for the chemical adsorption method.

A substrate which has few active hydrogens on its surface can be made into an appropriate substrate by increasing the numbers of active hydrogen on its surface by conventional chemical treatment such as by ozone oxidation or irraddiating it with an electron beam.

A chemically adsorbed molecule can be used alone or it can be diluted with solvent. Any solvent which is a non-aqueous organic solvent containing as little moisture as possible to keep the chemically adsorbed molecule from reacting with the hydroxyl molecule and to not substantially corrode the substrate and to dissolve the adsorbing molecule sufficiently. Examples of organic solvents are long chain alkyl-based solvents, aromatic hydrocarbon-based solvents, aliphatic hydrocarbon-based solvents and halogen-containing solvents.

In adsorbing a monomolecular film or a laminated film on to a substrate by a chemical adsorption method, a film is chemically bonded to a substrate and the thermomechanical stability of the film is increased and a substantially pin-hole free film can be formed. The orientation of film molecules can be controlled and at the same time the film has a voltage-proof property and a high voltage can be applied to the film. Thus, it is preferable in the invention that an electret comprising a sufficient surface electric charge can be formed.

A monomolecular film can be formed easily by washing with a non-aqueous organic solution such as chloroform to remove unreacted adsorbing molecules after the adsorption step. A monomolecular film or a monomolecular laminated film of an ultra thin polymer film electret is excellent for controlling the orientation of molecules. It is preferable in the invention to achieve an electret which has sufficient surface electric charge by controlling the orientation of the molecules.

Subsequently, forming a monomolecular film, a laminated film, or a polymerized film by the LB method will be described.

A molecule having amphipathic character comprising a hydrophilic group and a hydrophobic group and comprising a polymerized group can be used for the LB method. Examples of the hydrophilic group are a carboxyl group (—COOH), a phosphoric acid group (—PO$_3$), an amino group (—NH$_2$). Examples of polymerization groups are, for example, a hydrophobic unsaturated group such as a vinylene group (—CH= CH—), an ethynylene group (—C≡C—), a condensation hydrophilic group such as an amino group and a carboxyl group.

According to the invention, the ultra thin polymer film electret can be formed by the LB method. By the LB method, a thin polymerized film can be formed on a substrate by using a pre-polymerized polymer by addition condensation or condensation polymerization.

Substrates which can be used for the LB method are substrates comprising an active hydrogen which is used for the above mentioned chemical adsorption method. In addition, any substrate comprising non-active hydrogen can also be used.

A solution which can be used for the LB method is changed by the molecules of the film. Mainly, water and salt, added at a controlled pH, are used.

In forming a monomolecular film or a laminated film by the LB method, it is beneficial to be able to control the density and the condition of molecules in the film by controling the degree of polymerization. Further, it is beneficial to be able to use numerous kinds of molecules. In forming a pre-polymerized monomolecular film by the LB method, it is unnecessary to have a polymerization step after the film is formed. At the same time, in polymerizing the pre-formed monomolecular film or laminated film, it is beneficial that an adsorbing molecule is substantially free from elimination from a substrate.

According to the invention, an energy beam which is used for polymerization depends on the molecules of the film. Particularly, it depends on the kinds and numbers of the polymerized unsaturated groups. Examples of those are X-rays, electric beams, ultraviolet rays, and gamma rays. The strength of the energy beam also depends on the molecules of the film or the unsaturated groups.

High voltage is applied to a film in order to provide a surface electric charge. The strength of the direct electric field depends on the molecules of the film. However, it is preferable to apply $10^4$ to $10^7$ V/cm.

According to the invention, a monomolecular film or a laminated film, which is formed by the above mentioned chemical adsorption method or the LB method, has high orientation at the molecular level as a chain portion of the polymer is filled densely on the surface substrate. Thus, an ultra thin polymer layer electret, having a thickness on the molecular order, which has sufficient electric charge, can be formed. In addition, since the chemical adsorption polymer film of the invention is ultra thin film, in the order of nanometers or Angstroms, it does not spoil the characteristics of the substrate such as mechanical strength.

Subsequently, a detailed description of the invention will be described with concrete examples.

EXAMPLE 1

The case of forming a polymer ultra thin film by a chemical adsorption method will be described.

Figure 2:
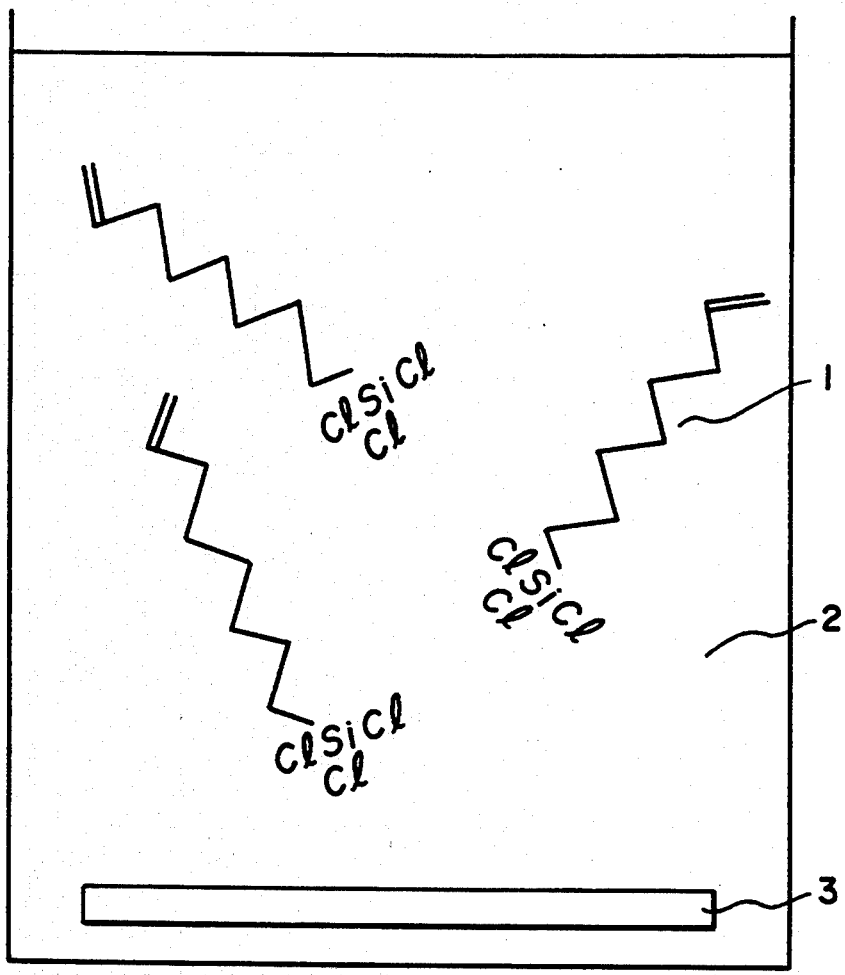
FIG. 2 shows a chemical adsorption step in an example of the invention.

A chemical adsorption step is illustrated in FIG. 2. Nonadecenyl trichlorosilane comprising a vinyl group as a polymerized unsaturated group was used as an adsorbing reagent 1. It was dissolved in a non-aqueous organic solvent 2 containing 10 mmol/L of nonadecenyl trichlorosilane. The non-aqueous organic solvent 2 contains 80% by weight of normal hexadecane, 12% by weight of chloroform and 8% by weight of carbon tetrachloride.

Figure 3:
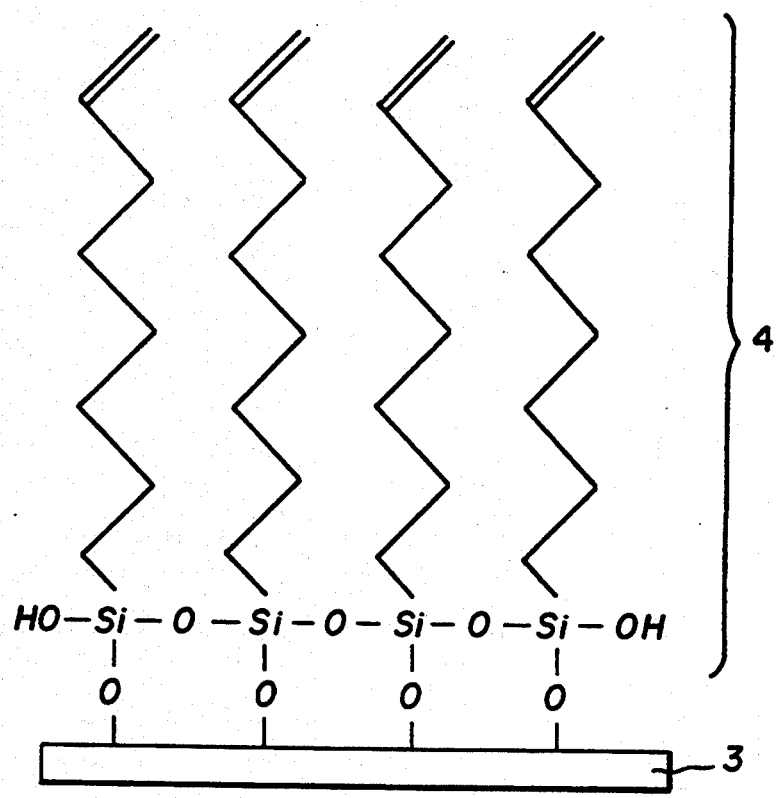
FIG. 3 shows a chemically adsorbed monomolecular film in an example of the invention.

The substrate 3 was dipped and held in the solution at 30° C. to start the chemical adsorption reaction. An aluminum substrate was used in the example of the invention as substrate 3. The substrate 3 was dipped and held in the solution for about five hours and washed with a non-aqueous organic solution, followed by washing with pure water, thus, the monomolecular film 4 illustrated in FIG. 3 was formed.

Figure 4:
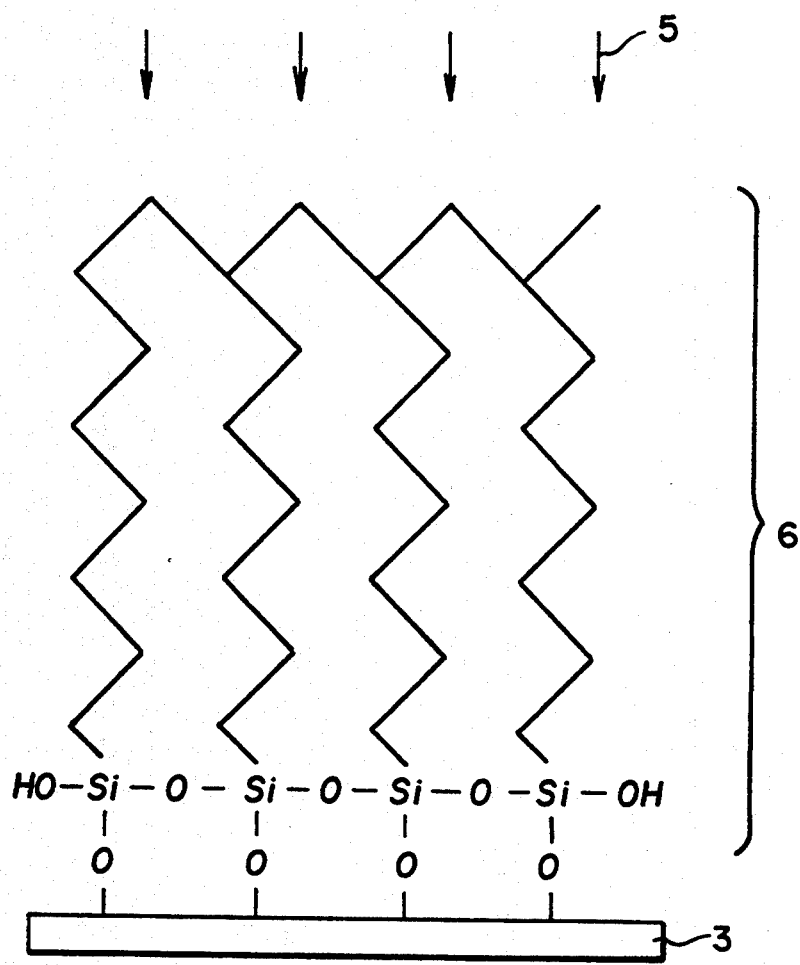
FIG. 4 shows a polymerization step of a molecular film in an example of the invention.

As illustrated in FIG. 4, a vinyl group was polymerized by irradiating the chemically adsorbed monomolecular film above with an electron beam 5 of about 5 Mrads in a vacuum atmosphere at normal temperature. According to an analysis of the pre-polymerized chemically adsorbed monomolecular film 4 and the polymerized film 6 by FT-IR, the vinyl group vanished after irradiating with the electron beam 5 and polymerization of the vinyl group was confirmed.

Figure 5:
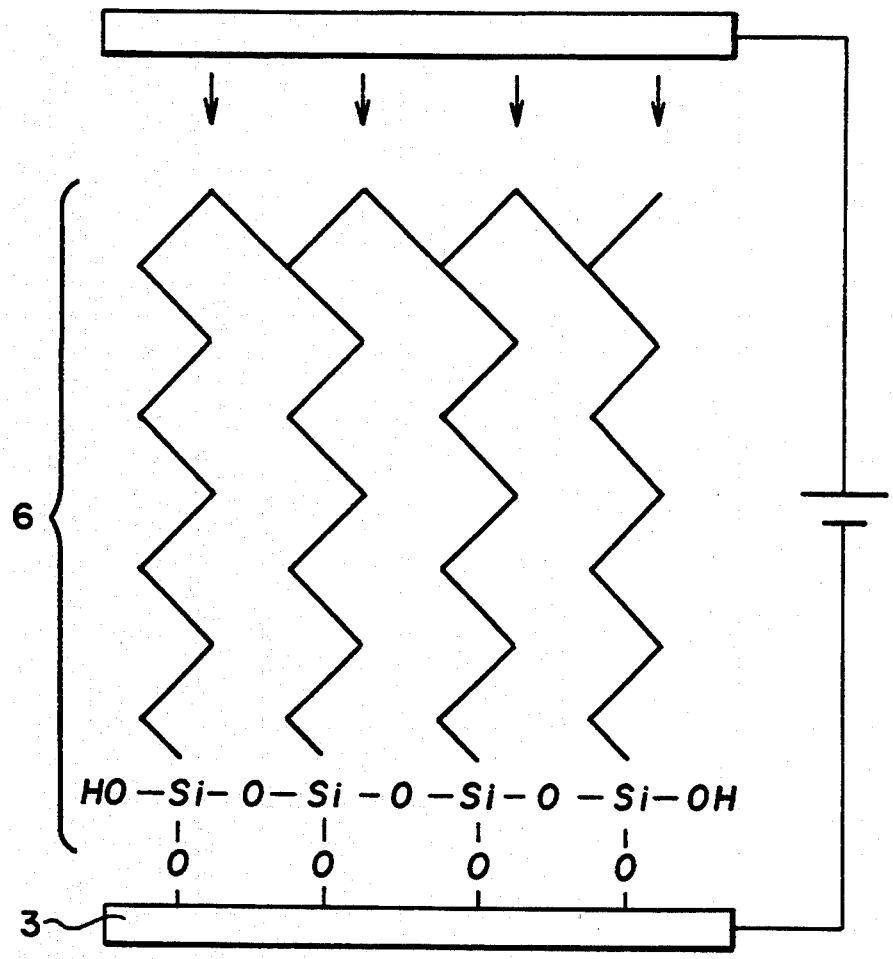
FIG. 5 shows a voltage-applying step in an example of the invention.

As illustrated in FIG. 5, an electric field of 200 kV/cm was applied to the polymerized film 6 at 120° C. Thus, an ultra thin polymer film electret 7, illustrated in FIG. 1, was formed.

The formed ultra thin polymer film electret had a surface electric charge of about $10^{-8}$ C/cm$^2$. The formation of chemicaly adsorbed polymer film was measured by FTIR. The thickness was about 2.3 nanometers (nm) measured by ESCA.

In the example of the invention, nonadecenyl trichlorosilane was used as an adsorbing reagent. The ultra thin polymer film electret was formed by experiments with the same condition except that nonadecenyl methyldichlorosilane, nonadecenyl dimethyldichlorosilane, nonadencenyl trichlorotitanium or nonadecenyl trichlorostannum was used as an adsorbing reagent.

EXAMPLE 2

Subsequently, the example of forming a chemically adsorbed laminated film will be described. In the example of the invention, 18-dimethylsilyl-14-octadecenyltrichlorosilane which has a vinyl group as an unsaturated group was used as an adsorbing reagent. The same kind of non-aqueous organic solvent as in Example 1 comprising 10 mmol/L of 18-dimethylsilyl-14-octadecenyltrichlorosilane was used.

An aluminum substrate was dipped and held in the solution at 30° C. to start the chemical adsorption reaction for about five hours and washed with chloroform as in Example 1, followed by washing with pure water.

Subsequently, a substrate comprising the chemically adsorbed monomolecular film was dipped and held in a methanol solvent containing 2.5% by weight of tetramethylammonium hydroxide solution for three hours. Thus after forming hydroxyl groups at the molecular ends to treat the substrate for lamination, the above mentioned chemical adsorption reaction was made to form a second layer molecular film and was, therefore, laminated. Repeating the above mentioned laminating steps, 10 layers of laminated film were formed.

The vinyl groups were polymerized by irradiating the thus formed laminated film with an electron beam of about 10 Mrads in a vacuum atmosphere at normal temperature. According to an analysis of the pre-polymerized laminated film and the laminated film by FT-IR, the vinyl group vanished and polymerization of the vinyl group was confirmed.

At the final step, a high electric field of 200 kV/cm at 120° C. was applied to the laminated film and an ultra thin polymer film electret was formed.

Thus formed ultra thin polymer film electret had about a $10^{-7}$ C/cm$^2$ surface electric charge. The formation of chemicaly adsorbed polymer film was measured by FTIR. The thickness was about 25 nanometers (nm) by ESCA.

According to the example of the invention, polymerization was initiated after forming the laminated film. However, the same kind electret was formed after each film layer was adsorbed.

EXAMPLE 3

Subsequently, the formation of an ultra thin polymer film by the LB method will be described. A molecule comprising a long chain alkyl portion and an unsaturated portion as shown in formula 1 was used to form the film.

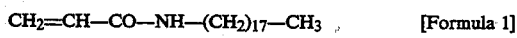

$$CH_2=CH-CO-NH-(CH_2)_{17}-CH_3 \qquad \text{[Formula 1]}$$

A monomolecular film was formed on an aluminum substrate at 20 m N/m surface voltage. A photo polymerization reaction was used by irradiating the monomolecular film with an ultraviolet ray for about one hour. According to an analysis of the pre-polymerized film and the polymerized film by FT-IR and the change in UV spectroscopy, essentially 100% polymerization was confirmed.

An ultra thin polymer film electret was formed by applying a 200 kV/cm voltage to the monomolecular film.

The ultra thin polymer film electret had about a $10^{-8}$ C/cm$^2$ surface electric charge. The formation of physicaly adsorbed polymer film was measured by FTIR. The thickness was about 2.4 nanometers (nm) by ESCA.

Further, fifty layers of laminated film were formed by the LB method. The same procedures as in Example 2 after forming the laminated film were carried out. Thus, the formed electret had about $10^{-6}$ C/cm$^2$ surface electric charge. The thickness was about 125 nanometers (nm) by ESCA.

EXAMPLE 4

A diamine molecule shown in formula 2 or a diester molecule shown in formula 3 was used in making the ultra thin polymer film.

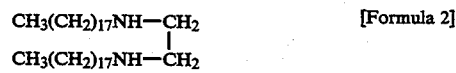

$$\begin{array}{l} CH_3(CH_2)_{17}NH-CH_2 \\ \qquad\qquad\qquad | \\ CH_3(CH_2)_{17}NH-CH_2 \end{array} \qquad \text{[Formula 2]}$$

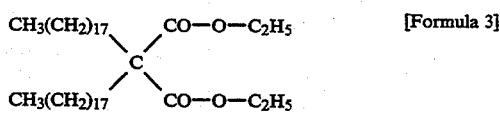

$$\begin{array}{c} CH_3(CH_2)_{17} \diagdown \quad \diagup CO-O-C_2H_5 \\ C \\ \diagup \quad \diagdown \\ CH_3(CH_2)_{17} \qquad CO-O-C_2H_5 \end{array} \qquad \text{[Formula 3]}$$

The molecule was polymerized by condensation polymerization at 5 mN/m of development solution comprising these molecules in a ratio of one to one. The polymerized film was formed on an aluminum substrate as a monomolecular film.

An ultra thin polymer film electret was formed by applying a 200 kV/cm voltage to the monomolecular film.

The formed ultra thin polymer film electret had about a $10^{-8}$ C/cm$^2$ surface electric charge. The formation of physicaly adsorbed polymer film was measured by FTIR. The thickness was about 2.6 nanometers (nm) by ESCA.

387 In the example of the invention, aluminum substrates were used. However, the same electrets were formed by using glass or silicon as a substrate.

COMPARATIVE EXAMPLE 1

An electret having about a $10^{-8}$ C/cm$^2$ surface electric charge was formed by irradiating a polytetrafluoroethylene film having a 10 μm thickness with an electron beam of 20 kV for several seconds at an electric current density of 0.05 μA/cm$^2$.

According to the invention, the ultra thin polymer film electret had a thickness of about 1/1000 as that of prior electrets. The ultra thin polymer film electret of the invention had the same amount of surface electric charge as that of prior electrets. The laminated form of the ultra thin polymer film electret had a greater surface charge than that of prior electrets.

The ultra thin polymer film electret in the example of the invention is put to practical use in the manufacture of super small-size microphones and speakers and motors. Further, the ultra thin polymer film electret in the invention is put to practical use in manufacturing small-size transformer devices utilizing electric proof property and artificial blood vessels in which blood is not substantially congealed.

As has been shown, the invention is greatly beneficial to industry.

The invention may be embodied in other specific forms without departing from the spirit or essential characteristics thereof. The present embodiment is to be considered in all respects as illustrative and not restrictive, the scope of the invention being indicated by the appended claims rather than by the foregoing description and all changes which come within the meaning and range of equivalency of the claims are intended to be embraced therein.

We claim:

1. A method of manufacturing an ultra thin polymer film electret having a dipole, comprising:
   (1) adsorbing a monomolecular film comprising an unsaturated group on to a substrate surface by subjecting an active hydrogen group on the substrate surface to a dehydrochlorination reaction with a compound containing an unsaturated group and at least one group selected from the group consisting of a chlorosilyl group, a chlorotitanyl group and a chlorostannyl group,
   (2) irradiating said monomolecular film with an energy beam to polymerize the unsaturated groups, and
   (3) applying a high voltage of $10^4$ to $10^7$ V/cm to said film.

2. The method of manufacturing an ultra thin polymer film electret having a dipole according to claim 1 further comprising:
   substituting the unsaturated group of the monomolecular film to an active hydrogen group by electron beam irradiation and subjecting said active hydrogen group to a dehydrochlorination reaction with the compound to adsorb another film on the monomolecular film after the step (1).

3. The method of manufacturing an ultra thin film electret according to claim 1, wherein said substrate is selected from the group consisting of quartz, glass, fluoride glass, metallic glass, aluminum, iron, stainless steel, titanium, silicon and germanium.

* * * * *